United States Patent [19]

Flaskey

[11] Patent Number: 5,340,259
[45] Date of Patent: Aug. 23, 1994

[54] ROUND BALE HANDLING TRAILER APPARATUS

[76] Inventor: David L. Flaskey, P.O. Box 113, 122 Carbon Ave., Roberts, Mont. 59070

[21] Appl. No.: 981,057

[22] Filed: Nov. 24, 1992

[51] Int. Cl.⁵ ............................................. B60P 1/48
[52] U.S. Cl. ................................. 414/24.5; 414/111; 414/546; 414/555; 414/909
[58] Field of Search .............. 414/24.5, 24.6, 111; 546/552, 553, 555, 909, 487, 740

[56] References Cited

U.S. PATENT DOCUMENTS

| | | | |
|---|---|---|---|
| 3,800,966 | 4/1974 | Newton | 414/555 X |
| 4,091,943 | 5/1978 | Bay-Schmith | 414/555 X |
| 4,096,960 | 6/1978 | Gilmore | 414/909 X |
| 4,459,075 | 7/1984 | Eichenberger | 414/24.5 |
| 4,552,501 | 11/1985 | Clark et al. | 414/555 X |
| 4,578,008 | 3/1986 | Gleason | 414/555 X |
| 4,952,111 | 8/1990 | Callahan | 414/555 X |

FOREIGN PATENT DOCUMENTS

| | | | |
|---|---|---|---|
| 2056879 | 5/1992 | Canada | 414/24.5 |
| 2585534 | 2/1987 | France | 414/24.5 |
| 1544263 | 2/1990 | U.S.S.R. | 414/24.5 |

Primary Examiner—David A. Bucci
Assistant Examiner—Janice Krizek
Attorney, Agent, or Firm—Risto A. Rinne, Jr.; Douglas M. Clarkson

[57] ABSTRACT

A round bale handling apparatus is described for the lifting, transportation, and unloading of round bales in cooperation with a motor vehicle. The apparatus has an upper frame assembly attached pivotally to a lower frame assembly. A conveyor on the upper frame assembly adjusts the position of bales on the apparatus. Lift arm assemblies have two sections spaced apart to place bales on the trailer one at a time and stacked. A stack of three bales is moved rearward on the upper frame assembly by the conveyor to provide additional space for loading additional bales. Side rails are attached to the upper frame and are adjustable by eccentrics to adapt the trailer to the size of round bale being loaded and to move the side rails pivotally toward the center of the trailer to conform to public highway regulations governing trailer width.

18 Claims, 2 Drawing Sheets

ROUND BALE HANDLING TRAILER APPARATUS

BACKGROUND OF THE INVENTION

1. Field of the Invention

The present invention, in general, relates to apparatus used to handle bales and, more particularly, to trailers that are used to load, transport, and unload round bales in cooperation with motor vehicles and farm tractors.

Round bales are too heavy for an individual to lift by hand. Also, these round bales are large and cumbersome, which makes transportation difficult. Various types of equipment have been devised to provide mechanical assistance to lift and to transport these round bales.

A round bale trailer must be operable over roadways as well as in the field. In other words, it must comply with the rules and regulations applicable to trailers that move over public roadways and still provide ease of use when in the field.

Clearly, a trailer-type apparatus for use in cooperation with motor vehicles that provides such assistance in the handling of round hay bales, is a useful and desirable device.

2. Description of Prior Art

Round bale handling apparatus are known. For example, the following United States patents describe various forms of this type of apparatus:

| | | |
|---|---|---|
| 4,076,138 | Honomichl, Sr. | February 28, 1978 |
| 4,259,034 | Ward et al. | March 31, 1981 |
| 4,261,676 | Balling, Sr. | April 14, 1981 |
| 4,441,845 | Gibson | April 10, 1984 |
| 4,549,840 | Ansbjer | October 29, 1985 |
| 4,630,986 | Taylor | December 23, 1986 |
| 4,789,289 | Wilson | December 6, 1988 |
| 4,930,958 | Palmer | June 5, 1990 |

While the structural arrangements of the above apparatus, at first appearance, have similarities with the present they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide a round bale trailer apparatus capable of loading a plurality of round bales effectively.

Another object of the invention is to provide a round bale trailer apparatus capable of being controlled remotely.

Briefly, a round bale handling trailer apparatus that is constructed in accordance with the principles of the invention has a frame that supports a conveyor system for moving bales along the length of the frame. Two arms are spaced apart a distance that permits them to engage each end of a bale to be loaded on the frame. All functions are controlled remotely.

The above and other objects, features and advantages the present invention will become more apparent from the following detailed description of the presently preferred embodiment as illustrated in the accompanying drawings.

DETAILED DESCRIPTION OF THE INVENTION

Figure 1:
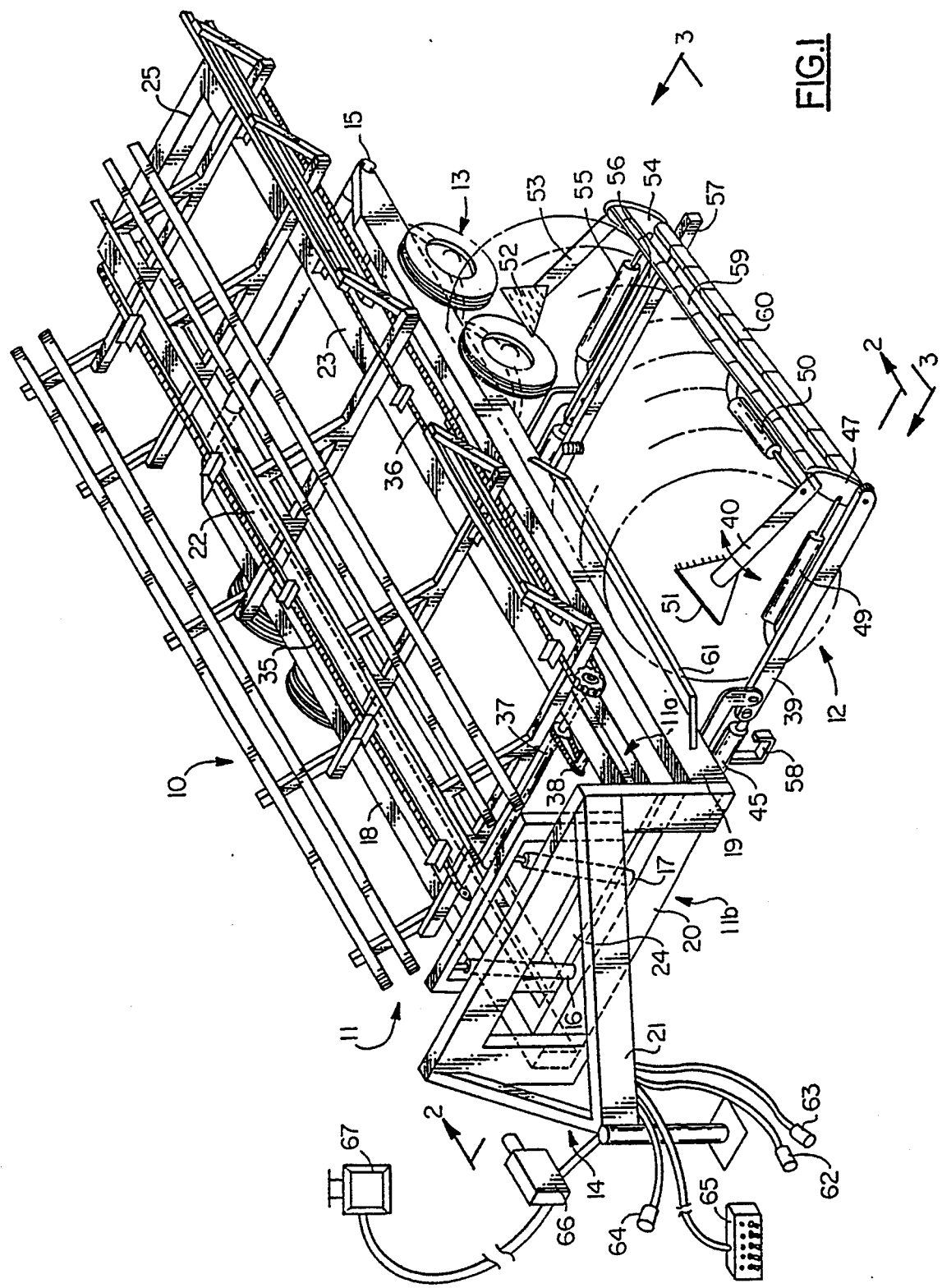
FIG. 1 is a perspective view of a round bale handling trailer apparatus in accordance with the invention.

In FIG. 1 of the drawings, the round bale handling trailer apparatus of the invention is identified generally by the numeral 10. The trailer apparatus 10 has two principal components: a frame 11 and bale loading arms 12. As will be described in more detail presently, the bale loading arms 12 are attached pivotally to one side of the frame 11.

The frame 11 is formed of two parts, an upper frame 11a and a lower frame 11b. While the overall frame 11 may be supported on a flat bed of another vehicle, it is preferred that it be supported on its own wheels 13, including springs. Therefore, the trailer 10 can be moved about simply by attaching the forward end 14 to a suitable motor vehicle, even to a farm tractor.

In accordance with the preferred form of the invention, the upper frame 11a is pivotal about a hinge 15 at the rear of the apparatus. Hydraulic cylinders 16 and 17 at the front of the apparatus raise that end of the upper frame 11a about the hinge 15 as a help in unloading bales.

The lower frame 11b has two girders 18 and 19 that extend somewhat less than the full length of the upper frame 11a, and they end at the hinge 15, so that the rear end of the upper frame 11a extends past the hinge 15, which makes that end close to the ground when the forward end is raised. The hinge 15 connects the rear end of the girders 18 and 19, and a cross girder 20 attaches the two girders 18 and 19 at the front end of the apparatus 10.

The front end 14 of the lower frame 11b is in the form of a fifth-wheel, gooseneck type of trailer hitch 21 so that the trailer apparatus 10 can be moved about in the field and even moved on a public road.

Now, the upper frame 11a has two girders 22 and 23 that support its main structure, and they extend from the front, where they are attached together by a cross girder 24, to the rear, where they are attached together by another cross girder 25. Before the two loading arms 12 are described, this description of the structure of the pivotal, upper frame 11a will be enlarged.

Figure 2:
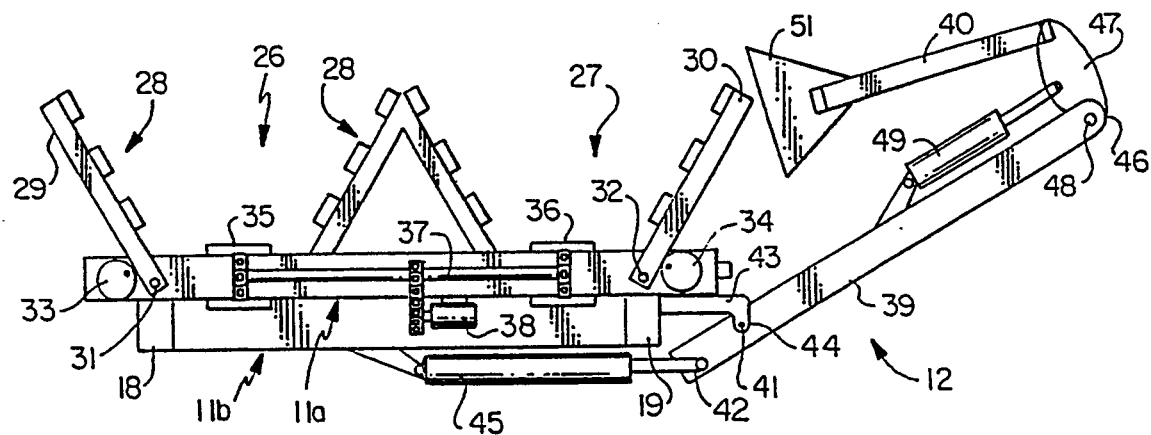
FIG. 2 is a view taken along the line 2—2 in FIG. 1.

FIG. 2 illustrates a view taken along the line 2—2 in FIG. of the drawings and shows two trough-like assemblies 26 and 27 along the length of the upper frame 11a. Each of the trough-like assemblies 26 and 27 has slats 28 positioned longitudinally so that bales in these areas can slide readily toward the rear, as will be described in more detail later.

Each of the sides 29 and 30 forming the outer sides of the troughs 26 and 27 are pivotable about respective pins 31 and 32, and in their outermost positions, they bear against eccentric cams 33 and 34. In their positions illustrated in this view, the sides 29 and 30 form the widest troughs 26 and 27, which easily can exceed the width of a trailer permited for moving on a public road. Therefore, to move the trailer apparatus 10 on a public road, the sides 29 and 30 are pivoted inwardly by moving the cams 33 and 34.

A conveyor 35 and 36 is located at the bottom of each trough 26 and 27 to move bales along the length of the trailer toward the rear. To ensure synchronism in movement, the two conveyors 35 and 36 are driven from a single shaft 37 turned by a reversible motor 38, so the conveyors are reversible to move the bales back and forth in the troughs as needed.

It is important to be able to move the bales (or each stack of three bales as will be described in greater detail hereinafter) in either direction to align the stacks tightly against each other to provide a more secure configuration for transport. It is also important to be able to use the bale engaging assembly 12 to unload bales from the trailer 10 and to stack them effectively. In order to use the bale engaging assembly 12 to unload bales from the trailer 10, it is necessary to reverse the direction of motion of the conveyors 35 and 36.

The bale engaging assembly 12 has two lift arms that are similar, and the one that is visible in this view is formed with two sections, identified as section 39 and 40. The section 39 is connected at a pivot point 41, a predetermined distance from its end 42, by an angle 43 with an end 44 that is lower than the girder 19 so that a hydraulic cylinder 45 can be connected at the end 42.

By an operation of the cylinder 45 against the end 42, the section 39 is pivoted about the point 41.

The end 46 of the section 39 is connected to the section 40 by an intermediate section 47. This section 47 is pivotal about the point 48 at the end 46 but is fixed pivotally with the section 40 in the plane of FIG. 2 but is pivotal in a plane perpendicular to this plane, so that a hydraulic cylinder 49 acting against the intermediate section 47 will raise and lower the section 40.

The section 40 is pivotal in a direction perpendicular to to this view by a hydraulic cylinder 50, FIG. 1, so that an end 51 is movable to squeeze a bale against an end 52 of a section 53. The section 53 is similar to the section 40 but is fixed with an intermediate section 54 similar to the section 47.

A hydraulic cylinder 55, similar to the cylinder 49, acting with the cylinder 49, raises and lowers the matching sections 40 and 53. There is a hydraulic cylinder barely visible in this view that matches the cylinder 45 connected in a similar manner with the section 56.

A bale locating arm 57 is connected pivotally at the under side of the lower frame 11b so that it is moved manually from a support 58 to a position illustrated in FIG. 1 against a stop. The use of this arm 57 will become more apparent from the description of the operation of the invention to follow.

Two sections 59 and 60 fixedly connect the two intermediate sections 47 and 54 together, and they are spaced apart to provide extra support between these two sections 47 and 54. By this structure, the two matching sections 39 & 40 and 56 & 53 are reenforced and quite capable of movement together as a unit.

A rub arm 61 is attached to the lower frame 11b and protrudes to ensure that a bale to be loaded is spaced from the trailer 10 and does not engage the trailer 10 as the bale engaging assembly 12 is operating.

Hydraulic fluid under pressure and electrical power are supplied by the towing vehicle. At least two separate hydraulic cables 62 and 63 permit hydraulic fluid under pressure to be received from, and returned to, the towing vehicle. An electrical connector 64 supplies electrical power from the towing vehicle to the trailer 10.

A remote, hand held, electric control unit 65 is connected by a length of electric cable to control the direction of flow of hydraulic fluid to the hydraulic components and, therefore, the operation of the various trailer 10 functions.

In a modification of the invention, the operator can observe directly the operation of the trailer 10, particularly the positioning of the trailer relative to a bale in the field and its loading operation, by a television camera 66 connected by a closed circuit cable to a television monitor 67.

Figure 3:
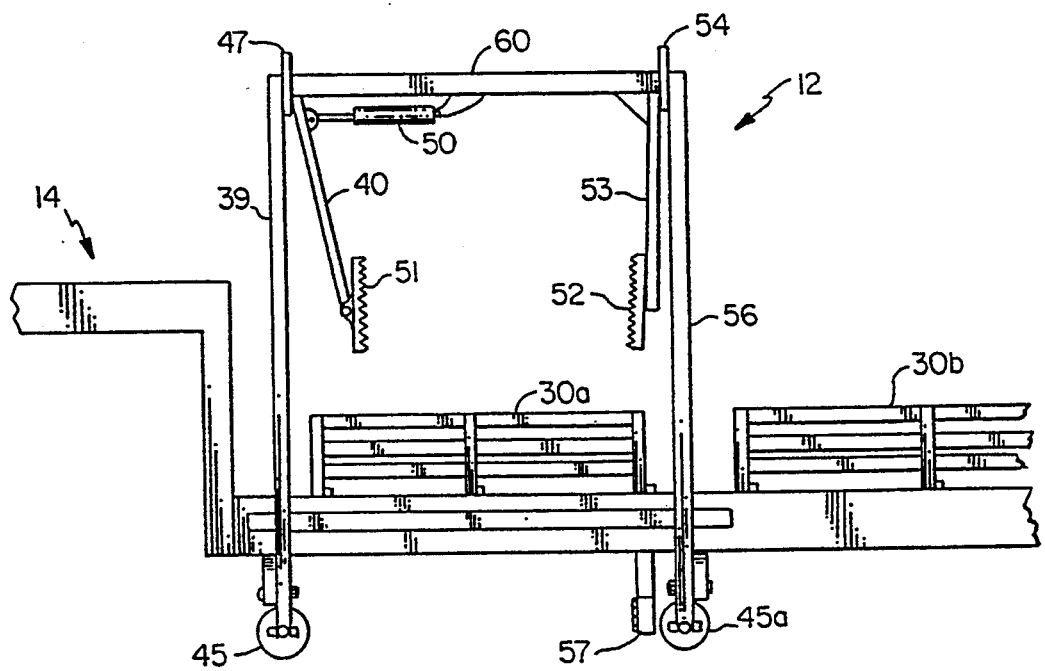
FIG. 3 is a side view of the bale engaging arms taken along the line 3—3 in FIG. 1.

In FIG. 3, the various structural components already described are illustrated in more detail. For example, the section 60 is shown better interconnecting the two sections 47 and 54, and the sections 39 and 56 are seen better in their spaced apart relationship, which distance apart is understood to be at least the length of a bale to be loaded.

Seen also in this view is the second hydraulic cylinder that is identified by the numeral 45a because it is similar to the cylinder 45 and acts in cooperation with the cylinder 45 to control the position of the two sections 39 & 40 and 56 & 53. In the case where the sections 56 & 53 must pivot up and back to load a bale, for example, in the further trough 26 (FIG. 2) and the section 56 would engage the side 30, it is seen better in this view that the side 30 is divided into two parts 30a and 30b leaving a space between them for the section 56 to move.

Operation

A round bale handling trailer apparatus 10 constructed and arranged according to the principles of the present invention, is attached to a motor vehicle for movement about a field where bales are scattered randomly. The locator arm 57 is moved out by hand to its operating position relative to the frame 11 to indicate when the trailer apparatus 10 is in position beside a bale to be picked up.

The locator arm 57 urges the bale forward as the trailer 10 continues moving. This forward motion of the bale serves as an indication to the operator that the bale is now indexed for loading.

The operator stops the trailer 10 and lowers the entire bale engaging assembly 12 over and about the bale. The bale assembly 12 attains an attitude that is approximately level relative to the ground and at a height above the ground that is approximately one-half of the diameter of the bale.

The operator energizes the cylinder 50 moving the section 40 which squeezes the bale effectively between the end 51 and the end 52. The assembly 12 then is raised above the ground with the bale to raise and move the bale over the side 30a and deposit it in the trough 26 that is furthest away from the assembly 12.

When the bale is in place, the squeeze arm section 40 is released to disengage the bale. The trailer 10 is towed to load another round bale in the field, the bale is indexed by the locator arm 57, and the bale engaging assembly 12 is pivoted, as described above, about the bale.

The bale is engaged by the squeeze arm section 40 and is raised onto the trailer 10 bed. In this instance, the bale is deposited parallel to the first loaded bale but is separated by the center assembly, and this bale is located in the trough 27.

Next, the trailer 10 is towed to a third round bale that is raised and deposited over the center assembly supported by the two bales that were loaded previously, forming a pyramid shaped structure of the three bales. The two lower bales exert their weight directly upon each of the conveyors 35 and 36, which also supports the third bale. The conveyors are energized and the three bales are moved toward the rear of the trailer.

When the three bales are moved far enough to the rear of the trailer, they pass over a spring loaded switch (not visible in the drawings). This alerts the operator to stop the conveyors. Since the conveyors are reversible, their position on the trailer can be adjusted as necessary.

The operator then collects more bales and repeats the above procedure as many times as is required to fill the particular length of the trailer 10. Once filled to capacity, or with the desired number of bales, the trailer 10 is towed to the destination for unloading.

For unloading, the two cylinders 16 and 17 are extended to raise the front of the upper frame 11a about the hinge 15. The conveyors 35 and 36 are energized, and the three rearmost bales move off the rear of the trailer 10. The trailer is moved forward slightly, and the process is repeated as many times as necessary to unload the remaining bales, in groups of three.

For some unloading conditions that require unusual care in the placement of bales, the bale engaging assembly 12 is used to unload bales one at a time. When using the assembly 12 in this manner, the unloaded bales are placed in a position that is limited only by the reach of the assembly 12.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. Bale handling trailer apparatus for use with motor vehicles to load, position, transport, and unload round bales, comprising:

first frame assembly means formed of a predetermined width and length;

second frame assembly means supported pivotally by said first frame assembly means;

conveyor means supported by said second frame assembly means to move bales in a predetermined manner with respect to said second frame assembly means;

bale engaging assembly means for supporting and conveying a bale with respect to said first frame assembly means, said bale engaging assembly means including a first section and a second section, said first section including a first lift arm having a first end and a second end and a second lift arm having a first end and a second end, said first left arm supported pivotally by said first frame assembly means at a first pivot location in close proximity to said first end of said first lift arm to pivot about said first pivot location, said second lift arm supported pivotally by said first frame assembly means at a second pivot location in close proximity to said first end of said second lift arm to pivot about said second pivot location, wherein said first pivot location and said second pivot location are disposed on a first pivotal axis for said bale engaging assembly, said first pivotal axis being disposed in parallel alignment with a longitudinal length of said first frame assembly means, said second lift arm being disposed a predetermined distance from said first lift arm sufficient to accommodate said bale therebetween and in substantially parallel alignment with respect to said first lift arm, said second section pivotally attached to said second end of said first lift arm and to said second end of said second lift arm and disposed to pivot about a second pivotal axis, said second pivotal axis being in parallel alignment with said first frame assembly means;

means for squeezing a bale, said means for squeezing a bale pivotally attached to said second section and disposed to pivot about a third pivotal axis, said third pivotal axis disposed perpendicular with respect to said second pivotal axis wherein said means for squeezing a bale is urged to prescribe an arc, the displacement of which is substantially in alignment with the longitudinal axis of said first frame assembly means; and power means to adjust the pivotal position of said bale engaging assembly means with respect to said first frame assembly means.

2. Bale handling trailer apparatus as defined by claim 1 wherein said power means includes hydraulic means for moving said bale engaging assembly means.

3. Bale handling trailer apparatus as defined by claim 1 including remote control means for operating said power means.

4. Bale handling trailer apparatus as defined by claim 3 wherein said remote control means includes switch means and electrical cable means.

5. Bale handling trailer apparatus as defined by claim 3 wherein said remote control means is in the form of a hand held unit.

6. Bale handling trailer apparatus as defined by claim 1 including means attached to said first frame assembly means for attaching to a motor vehicle.

7. Bale handling trailer apparatus as defined by claim 6 including wheel and axle means attached to said first frame assembly means to support said first frame assembly independent of said motor vehicle.

8. Bale handling trailer apparatus as defined by claim 1 including side rail means pivotally attached to said second frame assembly means to adjust the overall width of said apparatus.

9. Bale handling trailer apparatus as defined by claim 8 including eccentric means for supporting said side rail means in an adjusted position.

10. Bale handling trailer apparatus as defined by claim 1 wherein said bale engaging assembly means include first power means for pivoting said first section in a predetermined manner and second power means for pivoting said second section relative to said first section means in a predetermined manner.

11. Bale handling trailer apparatus as defined by claim 10 including third power means for moving said means for squeezing a bale in a direction to squeeze said bale for loading onto said trailer apparatus.

12. Bale handling trailer apparatus as defined by claim 11 wherein said trailer apparatus includes locator means connected to said first frame means for indexing bales into a position for acquisition by said bale engaging assembly means.

13. Bale handling trailer apparatus as defined by claim 11 wherein said bale engaging assembly means includes intermediate section means for pivotally attaching said second section to said first section, said intermediate section means connected pivotally to said first section at said second pivotal axis for pivotal movement wherein said second pivotal axis is parallel with said longitudinal length of said first frame assembly means, and said second section is fixedly attached to said intermediate section means whereby said second section is pivoted with respect to said first section by the pivotal motion of said intermediate section means about said second pivotal axis.

14. Bale handling trailer apparatus as defined by claim 13 wherein said second power means is attached to said first section at a first end of said second power means and is attached to said intermediate section means at a second end of said second power means for pivoting said second section relative to said first section.

15. Bale handling trailer apparatus as defined by claim 14 wherein said means for squeezing a bale includes an end for engaging a round bale, said end being serrated for positive, non-slipping engagement of said round bale.

16. Bale handling trailer apparatus as defined by claim 15 wherein said second frame assembly means is of a length longer than said length of said first frame assembly means, and an extended portion of said second frame assembly means extends past a pivotal support point between said first and second frame assembly means.

17. Bale handling trailer apparatus as defined by claim 16 including fourth power means attached at a first end of said fourth power means to said first frame assembly means and attached at a second end of said fourth power means to said second frame assembly means for raising a portion of said second frame assembly means relative to said first frame assembly means and for lowering said extended portion of said second frame assembly means.

18. Bale handling trailer apparatus as defined by claim 17 including pivotal outer sides on said second frame assembly means to retain said bales in a predetermined position relative to said conveyor means, and eccentric cam means for maintaining said outer sides in a predetermined position.

* * * * *